United States Patent Office 2,907,752
Patented Oct. 6, 1959

2,907,752

SYNTHETIC RUBBERY POLYESTER-POLYISO-CYANATE POLYMERS

Frank B. Smith, Detroit, Mich., assignor to United States Rubber Company, New York, N.Y., a corporation of New Jersey No Drawing. Application September 14, 1954
Serial No. 456,079

6 Claims. (Cl. 260—75)

This invention relates to a method of processing synthetic rubbery polymers, and more particularly it relates to the treatment, prior to cure, of curable polyester-polyisocyanate products containing available isocyanate groups in such manner as to provide final cured products characterized by improved physical properties. The invention also relates to the improved curable gum obtained by such treatment, and the improved cured product.

It has previously been known to obtain cured elastomeric synthetic polyurethane polymer by heating raw, curable, gum-rubber-like materials containing reactive isocyanate groups, which materials are obtained in the first instance by controlled reaction of water on a polyester-polyisocyanate intermediate. While the cured polyurethane elastomer thus obtained possesses a number of desirable physical properties that render it useful in many applications, there has nevertheless been a desire to improve upon the characteristics of this synthetic rubber in certain respects. In particular, it has been desired to provide a cured elastomer of this kind possessing lower hysteresis than the usual product, to enable the elastomer to be used to better advantage for such uses as manufacture of pneumatic tires, where the heat build-up occasioned by unduly high hysteresis is a limiting factor in the serviceability of the usual rubbery product.

I have now found, unexpectedly, that if the uncured processible gum, that is, the polyester-polyisocyanate modified by a carefully limited amount of water and containing available isocyanate groups which render it curable, is treated prior to cure with a further quantity of polyisocyanate there is obtained, after a subsequent curing step, an improved vulcanizate characterized by superior physical properties including significantly reduced hysteresis.

In practicing the invention there is initially provided a linear chain-extended polyester prepared from a glycol, for example, a mixture of ethylene and propylene glycols, and an aliphatic saturated dicarboxylic acid, for example, adipic acid, using an excess of the glycol over the acid so that the resulting polyester contains terminal alcoholic hydroxyl groups. Usually such an amount of glycol is used as to give a polyester having a hydroxyl number of 20 to 120 and preferably 36 to 67 and a low acid value less than 2 and preferably less than 1. This linear polyester is then reacted with a polyisocyanate, for example; triphenylmethane triisocyanate, naphthylene-1, 5-diisocyanate or p,p′-diphenylmethane diisocyanate, using a considerable molar excess, commonly from a 20 to 250% and preferably from a 50 to a 100% molar excess of the polyisocyanate over the theoretical amount corresponding to the alcoholic hydroxyl groups furnished by the polyester. The reaction is frequently effected by heating a mixture of the polyester and the polyisocyanate under anhydrous conditions at an elevated temperature, e.g., 70–150° C., to form a soluble material which is a linear polyurethane having terminal isocyanate groups. The resulting reaction product is usually a liquid material, which may be termed a polyester-diisocyanate intermediate.

The polyisocyanates employed in preparing the polyester-polyisocyanate intermediate are generally diisocyanates which may be represented by the general formula OCN—R—NCO, with R as a divalent hydrocarbon radical, as in polymethylene diisocyanates such as ethylene diisocyanate, hexamethylene diisocyante and tetramethylene diisocyantae; alkylene diisocyantes such as propylene-1,2-diisocyanate, cycloalkylene diisocyanates such as 1,4-diisocyanatocyclohexane, as well as aromatic diisocyanate such as m- and p-phenylene diisocyanate, toluene diisocyanate, p,p′-diphenyl diisocyanate and 1,5-naphthalene diisocyanate, in which category we include aliphatic-aromatic diisocyanate such as p,p′-diphenylmethane diisocyanate and phenylethane diisocyanate

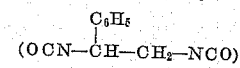

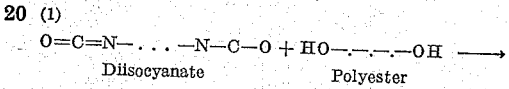

Reaction between the diisocyanate and the polyester may be represented generally as follows:

(1)

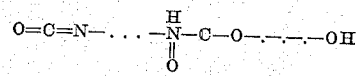

$$O=C=N-\ldots-\overset{H}{N}-\overset{}{\underset{\|}{C}}-O-\ldots-\ldots-OH$$
$$\phantom{O=C=N-\ldots-N-C}O$$

It will be seen that the process involves reaction of the active hydrogen atom of a terminal hydroxyl group of the polyester with an isocyanate group of the diisocyanate to form a urethane grouping between the two reactants. It will be noted that the product illustrated in the foregoing equation has a terminal isocyanate group on one end and a terminal hydroxyl group on the other end. A terminal group of one such molecule is therefore capable of reacting with a terminal group of another molecule, and in this way indefinite chain lengthening of the reaction product is theoretically possible. However, in the present practice there is employed as indicated previously an excess of polyisocyanate, and such excess serves to terminate the chain, thereby providing a molecule which may be represented as dominated by terminal isocyanate groups as follows:

(2)

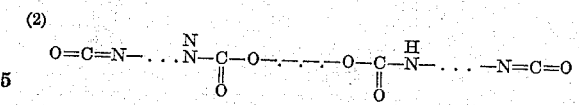

This represents the typical liquid polyester-diisocyanate intermediate product, which it will be noted is characterized by two terminal isocyanate groups.

The next step in the method of the invention involves converting the polyester-polyisocyanate intermediate reaction product into the form of a solid gum resembling uncured smoked sheet natural rubber. Such gum is uncured and capable of being processed in much the same manner as other raw rubbers, and it is curable or "vulcanizable," that is, it is capable of being converted, especially with the aid of heat, into an elastic cured state in which it resembles a typical vulcanized rubber. The cured product is a typical elastomer, that is, it is capable of being extended to at least 200% of its original length, and thereafter, upon being released, of returning rapidly to essentially its original length. Such conversion of the liquid polyester-polyisocyanate intermediate into a gum or uncured rubbery state is accomplished by treatment of the intermediate with a carefully controlled quantity of water. In order to obtain the desired curable product, it is essential to limit the amount of water that is reacted with the polyester-polyisocyanate intermediate. Specifically, the number of moles of water employed is substantially less than the number of available isocyanate groups present in the polyester-polyisocyanate intermediate so that isocyanate groups remain available in the polymer. As previously indicated, the typical polyester-diisocyanate intermediate prepared as described will contain two available terminal isocyanate groups per mole of intermediate. Each isocyanate group of the intermediate is capable of reacting with an equivalent quantity, i.e., with one molecule of water, in accordance with the following equation.

(3) 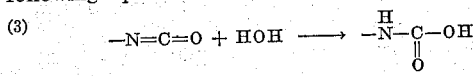

It is possible for the foregoing reaction to take place at each end of a molecule of the polyester-diisocyanate intermediate, and therefore two molecules of water are theoretically capable of being consumed in this way, and in this sense two moles of water are the stoichiometric equivalent of one mole of the intermediate. In the present invention, only about one-third of such stoichiometric quantity of water, that is, only about two-thirds of a mole of water, is reacted with each mole of the intermediate, and in this way only a proportionate part of the isocyanate groups are consumed in the first instance. Stated in terms of available isocyanate groups, there is employed only one-third of a mole of water per mole of available isocyanate in the molecule. Therefore, the amount of water is sufficient to consume ⅓ of the isocyanate groups by reaction 3 above. In practice, I usually employ from 0.5 to 0.9 mole of water per mole of polyester-polyisocyanate intermediate, that is, from about 0.25 to 0.45 mole of water per mole of available isocyanate in the intermediate. As a result of such limited reaction between the liquid intermediate and the specified quantity of water, there is obtained a solid product which still contains residual available isocyanate groups and can be cured to the rubbery state as indicated. The water is suitably combined with the intermediate by mixing the two materials in a suitable mixer, such as a Werner-Pfliederer mixer.

The solid, curable, processible gum obtained in this way is characterized by the fact that it is essentially unstable, that is, it cannot be kept unchanged for an indefinite period, but instead it gradually converts itself into a cross-linked state in which it cannot be worked up or shaped on the machines usual in the rubber industry. This self-curing property of the water-modified polyester-polyisocyanate product is explained by the fact that the reaction with water in the limited amounts specified leads to a series of further reactions that result ultimately in a cross-linked, cured, or "vulcanized" product. In more detail, the initial reaction product with water as represented above is unstable and decomposes with evolution of carbon dioxide to form a product containing amino groups as follows:

(4) 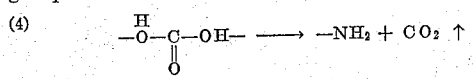

This reaction takes place during the mixing of the water with the intermediate, as evidenced by the evolution of carbon dioxide at that time. The resulting terminal amino groups are, in turn, highly reactive with available terminal isocyanate groups, to form urea linkages, thus:

(5) 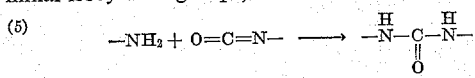

Reaction 3 above has as noted consumed ⅓ of the isocyanate groups, and reaction 5 also consumes another ⅓ of the isocyanate, leaving ⅓ of the isocyanate groups available for a subsequent curing reaction. The curable, solid gum intermediate is believed to be composed mainly of a linear polymer characterized by such urea linkages in the chain, along with still remaining terminal reactive isocyanate groups. This linear polymer is unstable, that is, it does not remain indefinitely in a linear, uncured state, because cross-linking gradually occurs between the urea linkages of one molecule and remaining available isocyanate groups of another molecule in the following manner:

(6) 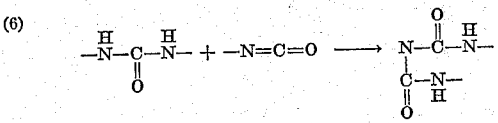

In this way there is built up an elastic, three-dimensional, cross-linked network, and the polymer becomes insoluble and infusible, and is no longer processible, and it possesses the properties of a truly vulcanized rubber. The cross-linking reaction 6 occurs even at room temperature, and therefore it is necessary to process the gum intermediate before too long a time has elapsed. Because the cross-linking reaction proceeds only slowly at room temperature, the uncured gum intermediate remains processible for reasonable periods of time, say a month or so, particularly if it is stored in closed containers so as to exclude it from contact with the moisture in the air.

In accordance with the invention, there is added to the curable gum intermediate containing reactive isocyanate groups, subsequent to the reaction with limited amounts of water as described but while it is still processible, a further quantity of polyisocyanate, suitably within the range of from 1 to 10 parts per 100 parts of the gum intermediate. The polyisocyanate may be the same as or different from the polyisocyanate originally employed in making the intermediate.

Triisocyanates represent preferred polyisocyanates and among these may be mentioned those having isocyanate groups attached to a trivalent hydrocarbon radical, whether an aliphatic, aromatic, or aliphatic-aromatic radical as in butane-1,2,2-triisocyanate, benzene-1,3,5-triisocyanate, diphenyl-2,4,4'-triisocyanate, diphenyl-4,6,4'-triisocyanate, toluene-2,4,6-triisocyanate, ethyl benzene-2,4,6-triisocyanate, and triphenylmethane 4,4',4''-triisocyanate. Triisocyanates derived from corresponding substituted trivalent hydrocarbon radicals, such as monochlorobenzene-2,4,6-triisocyanate may also be used. The various polyisocyanates employed may be represented collectively by the formula $R(-NCO)_x$, where R is an organic radical having a valence of 2 or 3 and $x$ is correspondingly 2 or 3. The polyisocyanate may be mixed in with the gum intermediate with the aid of conventional rubber mixing equipment, such as a roll mill or an internal mixer. Such treatment of the gum intermediate with polyisocyanate is carried out at elevated temperatures, suitably from 50° to 130° C., the preferred temperature range being from about 65° to 85° C. The heating is conveniently effected at the same time as the mixing, and the few minutes of milling required to mix the ingredients will also be sufficient to complete the treatment with the polyisocyanate. The mixing may typically be carried out for periods ranging from 5 minutes to 15–30 minutes; the longer mixing time being employed with the lower temperatures. The thus-treated gum intermediate is generally similar in physical properties to the gum intermediate before such treatment, and it is still processible and curable in the same manner. Like the untreated gum, the polyisocyanate modified gum is gradually self-curing and must be processed before too long a time has elapsed. However, the material is sufficiently stable to be marketed in this form, particularly if it is shipped and stored in tightly closed containers so that the moisture in the air, which would accelerate the cure, cannot reach the material. A month or more may elapse before the product becomes so cross-linked as to make processing difficult or impossible.

The polyisocyanate modified gum intermediate is processed in the manner usual with rubber stocks, that is, it is shaped into a desired form by such manipulations as molding, extruding and calendering. Additional compounding ingredients including fillers, reinforcing agents, pigments, and the like may be added if desired, by milling in the same manner as with rubber compounds. If desired, compounding ingredients may be added to the polyester-polyisocyanate intermediate before or after the treatment with water. The polyisocyanate modified gum may be associated with other materials, such as fabric, rubber, metal, wood etc., by laminating or coating as in the case of rubber.

After the polyisocyanate treated polyester-polyisocyanate gum has had the desired shape imparted to it, heat is applied to advance the cure. Curing times, for example, of from 10 minutes to two hours are suitable, at temperatures ranging, for example, from 100° to 170° C., and the cure is preferably carried out while the shaped material is confined under pressure to prevent blowing and insure the production of a dense, homogeneous "vulcanizate." The thus-cured material is observed to improve in physical properties over a period of time (e.g. one week or more) subsequent to such heating.

It is found that the present rubbery products resulting from cure of the polyisocyanate modified gum have markedly superior properties in certain respects, compared to the cured product obtained from a gum that has not been thus modified with polyisocyanate. In particular, the high temperature properties of the present cured polyisocyanate modified product are greatly improved, that is, the present product resists distortion under load at elevated temperature, and maintains its physical properties at elevated temperature, to a greater extent than would otherwise be attainable. The torsional hysteresis at 285° F. is markedly improved, as is the modulus. The present product is also characterized by enhanced resistance to solvents, and has improved resistance to swelling by such powerful solvents as dimethyl formamide.

While it is not desired to limit the invention to any particular theory of operation, the improvements in physical properties, especially the improvements realized at elevated temperature and the improved resistance to solvents, would indicate that the present cured polyisocyanate modified gum is in a more highly cross-linked state than the cured product obtained from a similar gum that has not been modified while still processible by treatment with polyisocyanate. The best evidence is that the added polyisocyanate reacts with the gum, probably on the active hydrogen sites on the urea groups. It is thought that the added polyisocyanate serves to cross-link adjacent polymer chains, the isocyanate molecule serving as a bridge between two urea groups on two separate chains. In the case of the triisocyanate it is possible that three polymer chains are linked together by one triisocyanate molecule. This is consistent with the observed fact that added triisocyanate is more effective than diisocyanate.

The following examples in which all parts are expressed by weight will serve to illustrate the practice of the invention in further detail.

EXAMPLE I

A curable gum containing available isocyanate groups was made as follows:

A polyester of molecular weight approximately 1900 was prepared by heating at 220–230° C. a mixture of about 11 moles of adipic acid, 11 moles of propylene glycol, and about 4.3 moles of ethylene glycol, to yield a polyester in which the terminal groups were primarily hydroxyl. Sufficient glycol was distilled from the reaction mixture to reduce the hydroxyl number to between 50 and 60. The acid number of the polyester was approximately 1. This polyester was reacted with 2 moles (500 parts per 1900 parts of polyester) of 4,4′-diisocyanatodiphenylmethane for approximately 1 hour at a temperature of 80–100° C. in a Werner-Pfliederer mixer. This intermediate was a liquid and was soluble in the common organic solvents such as acetone, and contained two available isocyanate groups per molecule.

The polyester-diisocyanate intermediate so produced was converted to the gum stage by adding about 10.8 parts of water to 2400 parts of the intermediate while working the mix in the Werner-Pfliederer mixer. This amount of water corresponded to about 0.6 mole per mole of intermediate (or 0.3 mole per mole of available isocyanate groups in the intermediate, since each mole of intermediate contained two moles of available isocyanate) and served to convert the intermediate into a curable, processible gum stage, characterized by the presence of residual available isocyanate groups.

The thus-prepared curable gum while still in a processible condition (the gum was self-curing and would have become cross-linked and unprocessible after standing for a month or so, especially if exposed to air) was divided into several separate portions. One portion, designated portion A, was molded into test slabs which were cured under pressure in molds using various sets of curing conditions, as indicated in Table I, below, and the physical properties of the resulting "vulcanizates" were then determined (after the cured samples and been allowed to stand for one week) with the results indicated in Table I.

Another portion of the processible gum, designated B, was modified by treating 100 parts of the gum with 5 parts of a 50% solution of diphenylmethane diisocyanate in o-dichlorobenzene on a rubber mill at a temperature of 75° C. for about 15 minutes. During the mixing, the o-dichlorobenzene volatilized. Two days later the thus-modified gum "B" was then cured in molds and tested as in the case of the untreated portion A, with the results shown in Table I.

A portion C of the curable gum (100 parts) was similarly treated with 6 parts of a 20% solution of triphenyl triisocyanate in methylene chloride. The methylene chloride evaporated during the treatment. Molded cured samples were again tested, with the results presented in Table I.

*Table I.—Effect of treatment with polyisocyanate*

| Composition | Stocks | | |
|---|---|---|---|
| | A | B | C |
| Gum | 100 | 100 | 100 |
| MDI-50 [1] | | 5 | |
| TTi [2] | | | 6 |

| Cure | Test | | | |
|---|---|---|---|---|
| 30′ at 30# | 300% Modulus, p.s.i. | 700 | 740 | 1,180 |
| 45′ at 45# | | 700 | 720 | 1,080 |
| 30′ at 30# | 500% Modulus, p.s.i. | 1,720 | 2,080 | 2,940 |
| 45′ at 45# | | 1,600 | 1,900 | 2,540 |
| 30′ at 30# | Tensile, p.s.i. | 6,000 | 5,900 | 5,000 |
| 45′ at 45# | | 5,520 | 5,460 | 4,460 |
| 30′ at 30# | Elongation, percent | 780 | 785 | 700 |
| 45′ at 45# | | 775 | 725 | 625 |
| 30′ at 30# | Torsional Hysteresis, Room Temp.[3] | .109 | .115 | .103 |
| 45′ at 45# | | .133 | .119 | .120 |
| 30′ at 30# | Torsional Hysteresis, 285° F. | .077 | .063 | .049 |
| 45′ at 45# | | .108 | .069 | .061 |

[1] MDI-50 is a 50% Solution of diphenylmethane diisocyanate in o-dichlorobenzene solvent.
[2] TTi is a 20% solution of triphenyl triisocyanate in methylene chloride solvent.
[3] Torsional hysteresis determined by method of Mooney and Gerke, Rubber Chem. and Tech. 1941, Vol. 14, pp. 35–54.

It will be evident from Table I that the stocks B and C of the invention, in which the curable gum was modified by treatment with polyisocyanate, possessed when cured physical properties superior to those of the stock A which was not treated in accordance with the invention prior to cure. The improvement realizable by the invention is seen especially in the increased modulus, decreased hysteresis.

EXAMPLE II

The procedure of Example I was repeated, using varying amounts of polyisocyanate, as shown in Table II. Stock D, in which the polyisocyanate treatment of the invention was omitted, was included as a control. The treated samples were cured on the same day as they were mixed with the polyisocyanate. The physical tests were made one week later. In Table II striking improvements are seen in the physical properties of stocks E, F, G, H, I treated in accordance with the invention, in comparison to the untreated stock D.

EXAMPLE III

Table III shows the results obtained with further stocks, using the same procedure as in Example II. Stock J is an untreated control, while stocks K, L, M, N, O represent the treatment with polyisocyanate in accordance with the invention. The swelling data presented in Table III are of particular interest, as indicating that the cured product obtained from the polyisocyanate treated gum of the invention is more highly cross-linked than the cured untreated gum.

*Table II.—Effect of treatment with polyisocyanate*

| Composition | | Stocks | | | | | |
|---|---|---|---|---|---|---|---|
| | | D | E | F | G | H | I |
| Gum | | 1,000 | 1,000 | 1,000 | 1,000 | 1,000 | 1,000 |
| MDI-50 | | | 50 | 100 | | 50 | 100 |
| TTi | | | | | 25 | | |

| Cure | Test | | | | | | |
|---|---|---|---|---|---|---|---|
| 15′ at 30# | 300% Modulus, p.s.i | 480 | 880 | 1,200 | 680 | 700 | 860 |
| 30′ at 30# | | 480 | 820 | 1,200 | 480 | 600 | 700 |
| 15′ at 45# | | 460 | 800 | 1,100 | 460 | 440 | 880 |
| 30′ at 45# | | 480 | 820 | 1,200 | 480 | 600 | 800 |
| 45′ at 45# | | 440 | 780 | 1,100 | 440 | 480 | 500 |
| 15′ at 30# | 500% Modulus, p.s.i | 1,600 | 2,480 | | 2,000 | 2,380 | 3,100 |
| 30′ at 30# | | 1,660 | 2,200 | 3,200 | 1,620 | 2,200 | 2,400 |
| 15′ at 45# | | 1,500 | 2,200 | 2,800 | 1,580 | 1,800 | 3,700 |
| 30′ at 45# | | 1,580 | 2,100 | 3,000 | 1,600 | 2,000 | 2,080 |
| 45′ at 45# | | 1,300 | 1,800 | 2,560 | 1,600 | 1,800 | 1,880 |
| 15′ at 30# | Tensile, p.s.i | 5,410 | 5,480 | 3,400 | 6,400 | 5,310 | 5,600 |
| 30′ at 30# | | 8,080 | 6,200 | 6,200 | 7,320 | 6,880 | 4,380 |
| 15′ at 45# | | 6,790 | 5,480 | 3,900 | 5,780 | 6,000 | 6,210 |
| 30′ at 45# | | 6,400 | 7,040 | 6,060 | 6,600 | 6,060 | 5,980 |
| 45′ at 45# | | 4,900 | 6,280 | 4,770 | 6,900 | 6,670 | 4,600 |
| 15′ at 30# | Elongation, percent | 755 | 665 | 480 | 715 | 640 | 600 |
| 30′ at 30# | | 845 | 715 | 635 | 795 | 695 | 615 |
| 15′ at 30# | | 835 | 680 | 535 | 760 | 740 | 575 |
| 30′ at 30# | | 845 | 755 | 625 | 790 | 710 | 685 |
| 45′ at 30# | | 850 | 825 | 595 | 825 | 755 | 695 |
| 15′ at 30# | Torsional Hysteresis at 285° F | .088 | .052 | .065 | .071 | .057 | .055 |
| 30′ at 30# | | .091 | .052 | .053 | .074 | .051 | .066 |
| 15′ at 45# | | .096 | .054 | .052 | .095 | .057 | .048 |
| 30′ at 45# | | .108 | .069 | .047 | .116 | .063 | .076 |
| 45′ at 45# | | .114 | .070 | .058 | .107 | .068 | .096 |

*Table III.—Effect of treatment with polyisocyanate*

| Composition | | Stocks | | | | | |
|---|---|---|---|---|---|---|---|
| | | J | K | L | M | N | O |
| Gum | | 1,400 | 1,300 | 1,300 | 1,300 | 1,300 | 1,300 |
| MDI-50 | | | 104 | 130 | | | 52 |
| TDI[1] | | | | | 82 | | |
| TTi | | | | | | 98 | 26 |

| Cure | Test | | | | | | |
|---|---|---|---|---|---|---|---|
| 15′ at 30# | 300% Modulus, p.s.i | 560 | 1,100 | 1,200 | | 880 | 700 |
| 30′ at 30# | | 600 | 1,140 | 1,260 | 800 | 1,000 | 760 |
| 15′ at 45# | | 520 | 960 | 920 | 880 | 900 | 760 |
| 30′ at 45# | | 480 | 1,000 | 1,200 | 800 | 820 | 600 |
| 45′ at 45# | | 560 | 1,100 | 1,200 | | 900 | 700 |
| 15′ at 30# | Tensile, p.s.i | 5,260 | 3,040 | 4,700 | | 5,480 | 5,660 |
| 30′ at 30# | | 5,720 | 6,030 | 5,080 | 1,600 | 7,060 | 5,600 |
| 15′ at 45# | | 6,880 | 6,400 | 5,200 | 2,480 | 6,400 | 5,500 |
| 30′ at 45# | | 5,400 | 4,800 | 4,000 | 900 | 6,520 | 4,360 |
| 45′ at 45# | | 6,000 | 6,920 | 5,110 | | 6,600 | 6,080 |
| 15′ at 30# | Elongation, percent | 770 | 530 | 615 | | 640 | 675 |
| 30′ at 30# | | 815 | 675 | 595 | 450 | 640 | 680 |
| 15′ at 45# | | 865 | 725 | 685 | 525 | 670 | 655 |
| 30′ at 45# | | 840 | 665 | 560 | 325 | 695 | 655 |
| 45′ at 45# | | 850 | 735 | 660 | | 690 | 710 |
| 15′ at 30# | Torsional Hysteresis at 285° F | .084 | .046 | .047 | .071 | .048 | .060 |
| 30′ at 30# | | .093 | .053 | .057 | .089 | .047 | .061 |
| 15′ at 45# | | .103 | .059 | .059 | .096 | .052 | .047 |
| 30′ at 45# | | .119 | .057 | .051 | .081 | .046 | .081 |
| 45′ at 45# | | .128 | .063 | .058 | .075 | .056 | .067 |
| 15′ at 30# | Swelling in Dimethyl Formamide [2] | .107 | .214 | .206 | .215 | .235 | .223 |
| 30′ at 30# | | .068 | .177 | .194 | .214 | .273 | .279 |
| 15′ at 45# | | .083 | .141 | .158 | .208 | .213 | .205 |
| 30′ at 45# | | .037 | .128 | .267 | .322 | .247 | .172 |
| 45′ at 45# | | Disintegrated | .115 | .166 | .218 | .119 | .154 |

[1] TDi is 65% tolylene diisocyanate in o-dichlorobenzene solvent.
[2] The higher the number the greater the number of cross-links. Swelling tests, as described by Flory, Rubber Chem. and Tech. 1946, vol. 19, pp. 552-598 are widely used to estimate the degree of cross-linking in polymers.

The improved results obtainable by means of the invention, as illustrated in the foregoing examples, are obtainable only by carrying out the modification with polyisocyanate subsequently to the initial reaction with water of the polyester-polyisocyanate intermediate, and prior to substantial cross-linking of the water-reacted gum. An important feature of the process as described is that the polyisocyanate is added to a gum intermediate which is curable by reason of the presence of available isocyanate groups which are contained in the gum because the quantity of water employed in producing the gum was less than the quantity stoichiometrically equivalent to the isocyanate groups. If, in contrast to this, the quantity of water reacted with the polyester-polyisocyanate intermediate exceeds the amount stoichiometrically equivalent to the isocyanate groups then all such isocyanate groups will be consumed in the first instance and the product will not be curable (cross-linkable), nor can modification of the product with polyisocyanate be employed to produce either the new curable gum of the invention or the improved final cured rubbery material of the invention.

Having thus described my invention, what I claim and desire to protect by Letters Patent is:

1. A method comprising mixing that quantity of a linear polyester-diisocyanate intermediate obtained by anhydrous reaction of 1 mole of a linear polyester containing terminal hydroxyl groups and having a hydroxyl number of 20 to 120 and an acid value less than 2, and 2 moles of a diisocyanate of the formula OCN—R—NCO, wherein R is a divalent hydrocarbon radical, with from 0.5 to 0.9 mole of water to provide a processible, curable, unstable gum containing reactive isocyanate groups, and subsequently milling 100 parts of said gum with from 1 to 10 parts of a polyisocyanate of the formula $R(-NCO)_x$ where R is a polyvalent hydrocarbon radical having a valence not greater than 3 and $x$ has the same value as said valence, at a temperature of about 65° to 85° C., whereby said curable gum is rendered capable of yielding a more highly cross-linked product than would be obtained without said treatment with polyisocyanate.

2. A method as in claim 1 in which the said polyisocyanate is a triisocyanate.

3. The curable gum obtained by the method of claim 2.

4. An elastomer of enchanced high temperature properties which is a cured reaction product obtained by heat-curing the gum of claim 3.

5. The curable gum obtained by the method of claim 1.

6. An elastomer of enhanced high temperature properties which is a cured reaction product obtained by heat-curing the gum of claim 5.

References Cited in the file of this patent

UNITED STATES PATENTS

| | | |
|---|---|---|
| 2,621,166 | Schmidt et al. | Dec. 9, 1952 |
| 2,729,618 | Muller et al. | Jan. 3, 1956 |
| 2,751,363 | Martin | June 19, 1956 |
| 2,785,150 | Kreider et al. | Mar. 12, 1957 |

OTHER REFERENCES

Bayer et al.: Rubber Chem. and Tech., October-December 1950, pages 812–835.

B.I.O.S. Final Report #1166, Office of Technical Services, Dept. of Commerce, Washington, D.C., March 1951.